(12) United States Patent
Khanka et al.

(10) Patent No.: US 8,060,133 B1
(45) Date of Patent: Nov. 15, 2011

(54) METHOD AND APPARATUS FOR DYNAMICALLY VARYING INTERVAL ON FIRST AIR INTERFACE PROTOCOL BASED ON SWITCH-AWAY TIME FOR SCANNING SECOND AIR INTERFACE PROTOCOL

(75) Inventors: Bhagwan Khanka, Lenexa, KS (US); Sachin R. Vargantwar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 478 days.

(21) Appl. No.: 12/401,998

(22) Filed: Mar. 11, 2009

(51) Int. Cl.
*H04M 1/00* (2006.01)

(52) U.S. Cl. .................. 455/552.1; 455/436; 455/435.2; 370/345; 370/331

(58) Field of Classification Search ............... 455/435.2, 455/436, 437, 443, 552.1, 553.1, 557; 370/331, 370/332, 345
See application file for complete search history.

(56) References Cited

U.S. PATENT DOCUMENTS

| | | | |
|---|---|---|---|
| 6,477,162 B1 | 11/2002 | Bayley et al. | |
| 7,738,427 B1 * | 6/2010 | Yew et al. | 370/332 |
| 7,933,602 B1 * | 4/2011 | Balakrishnan et al. | 455/437 |
| 8,005,061 B2 * | 8/2011 | Abdel-Kader et al. | 370/345 |
| 2005/0169227 A1 * | 8/2005 | Dowling | 370/342 |
| 2006/0104228 A1 * | 5/2006 | Zhou et al. | 370/328 |
| 2006/0205406 A1 | 9/2006 | Pekonen et al. | |
| 2007/0232330 A1 | 10/2007 | Ranganathan | |
| 2011/0090880 A1 * | 4/2011 | Abraham et al. | 370/338 |

OTHER PUBLICATIONS

Q. Song and A. Jamalipour, "A Time-Adaptive Vertical Handoff Decision Scheme in Wireless Overlay Networks," The 17th Annual IEEE International Symposium on Personal, Indoor and Mobile Radio Communications, 2006.

* cited by examiner

*Primary Examiner* — Don Le

(57) ABSTRACT

Disclosed is a method and apparatus for dynamically varying the amount of time a hybrid access terminal operates on a first air interface protocol between instances of temporarily switching over to scan a second air interface protocol for broadcast information such as network operational parameters or page messages. The hybrid access terminal dynamically sets a minimum interval of operation on the first air interface protocol based on how long the access terminal has tended to be temporarily switched away to scan for broadcast information on the second air interface protocol. For example, as the switch-away time increases, the access terminal may increase the interval on the first air interface protocol, and as the switch-away time decreases, the access terminal may decrease the interval on the first air interface protocol.

20 Claims, 4 Drawing Sheets

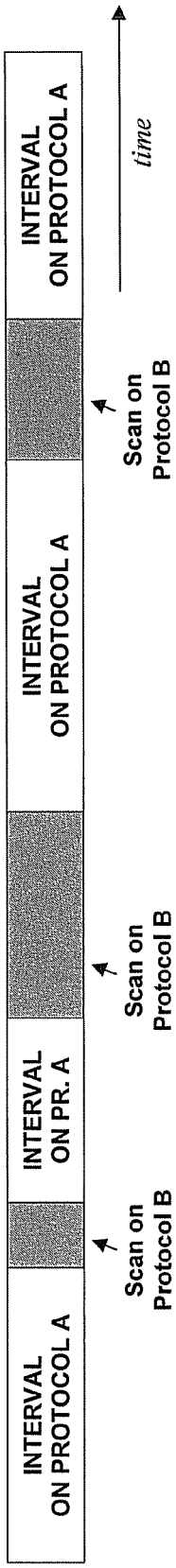
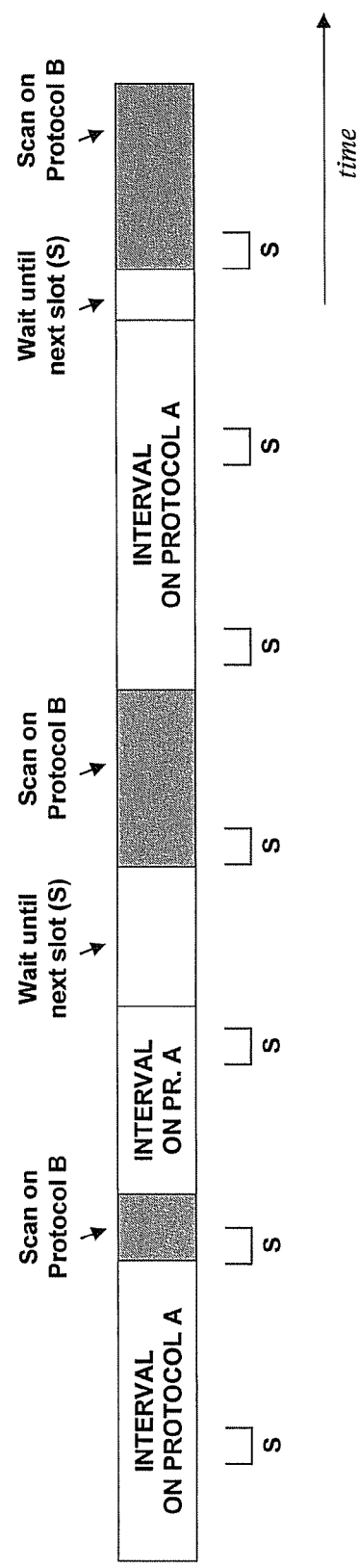
Fig. 4
Fig. 5

METHOD AND APPARATUS FOR DYNAMICALLY VARYING INTERVAL ON FIRST AIR INTERFACE PROTOCOL BASED ON SWITCH-AWAY TIME FOR SCANNING SECOND AIR INTERFACE PROTOCOL

BACKGROUND

In a typical cellular radio communications system (wireless communication system), an area is divided geographically into a number of coverage areas (namely, cells and cell sectors), each defined by a radio frequency (RF) radiation pattern from a respective base transceiver station (BTS) antenna. The base station antennae in the cells may then be coupled with a base station controller (BSC) (or radio network controller (RNC)), which may then be coupled with a telecommunications switch or gateway, such as a mobile switching center (MSC) or packet data serving node (PDSN) for instance. The switch or gateway may then be coupled with a transport network, such as the public switched telephone network (PSTN) or a packet-switched network (e.g., the Internet).

When an access terminal (such as a cellular telephone, pager, or appropriately equipped portable computer, for instance) is positioned in a coverage area, the access terminal communicates via an RF air interface with the BTS antenna of the coverage area. Consequently, a communication path can be established between the access terminal and the transport network, via the air interface, the BTS, the BSC and the switch or gateway.

As an access terminal moves between coverage areas of a wireless communication system, or when network conditions change or for other reasons, the access terminal may "hand off" from operating in one coverage area to operating in another coverage area. In a usual case, this handoff process is triggered by the access terminal monitoring the signal strength of signals that it is receiving in various available coverage areas, and the access terminal or the BSC determining when one or more threshold signal strength criteria are met. For instance, the access terminal may monitor signal strength in various available coverage areas and notify the BSC when a given coverage area has a signal strength that is sufficiently higher than the coverage area in which the access terminal is currently operating. The BSC may then direct the access terminal to hand off to that other coverage area.

In practice, communications over the air interface between a BTS (base station) and a access terminal will comply with a defined air interface protocol or "access technology." Numerous such protocols are well known in the art, and others will be developed in the future. Examples of existing protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. Each protocol may define its own procedures for handoff between coverage areas and may define other procedures and parameters related to air interface communication, such as particular air interface transmission mechanisms (e.g., coding, frequency, etc.)

Furthermore, in some cases, more than one air interface protocol might be implemented in a given market area. For example, a given market area might provide both legacy CDMA 1xRTT coverage under a standard protocol such as EIA/TIA/IS-2000 Rel. 0, Rel. A or another version thereof (hereafter "an IS-2000 protocol") and also high data rate 1xEV-DO coverage according to a standard protocol such EIA/TIA/IS-856 Rel. 0, Rel. A, or another version thereof (hereafter "an IS-856 protocol"). In a system that provides two or more air interface protocols in a single area, a access terminal might not only hand off between coverage areas under a common air interface protocol (e.g., between IS-2000 sectors) but may also hand off between the different air interface protocols (e.g., between IS-2000 and IS-856) within a given physical location or when moving between locations. Handoff between different air interface protocols is known as "vertical" handoff.

OVERVIEW

To facilitate vertical handoff, an access terminal operating under one air interface protocol may periodically check for availability of service under another air interface protocol. When the access terminal detects that the signal strength provided by the other air interface protocol is sufficiently higher than signal strength provided by the current air interface protocol, the access terminal may then request a handoff to the other air interface protocol, in much the same way that an access terminal would request handoff between coverage areas of a common air interface protocol.

Furthermore, when the access terminal is operating on a given air interface protocol, the access terminal may periodically switch over to another air interface protocol to obtain network operational parameters or other information being broadcast on the other air interface protocol, so that the access terminal can be ready to operate on that other air interface protocol should a handoff become necessary. For instance, when an access terminal is engaged in data communication on IS-856, the access terminal may periodically switch over to IS-2000 to scan a paging channel and/or other overhead channels on IS-2000 so as to obtain IS-2000 network operational parameters that the access terminal could use in the event the access terminal needs to handoff to IS-2000.

In addition, if the access terminal is capable of receiving an incoming page (e.g., for a call or other communication) on the other air interface protocol, the access terminal may periodically switch over to the other air interface protocol to scan for such a page. To conserve battery power, such paging may be set to occur at particular time slots according to a defined slot cycle. For instance, under IS-2000, an access terminal may operate at a slot cycle of 5.12 seconds, so that the access terminal would scan a paging channel every 5.12 seconds to determine whether any page messages for the access terminal are present, and a serving base station would be set to transmit any page message to the access terminal on such a time slot. If a hybrid access terminal such as a cell phone is engaged in data communication on IS-856 and is capable of receiving pages on IS-2000, the access terminal may thus switch over to IS-2000 at each time slot of its slot cycle to scan for a page message and may then switch back to IS-856.

In general, an access terminal that is capable of operating on air interface protocol A may be set to periodically switch over to protocol B to scan for broadcast information, but to stay on protocol A for at least a designated interval of time between those instances of switching over to protocol B. If the access terminal does not need to check for page messages or the like at specific time slots on protocol B but simply needs to scan protocol B for the latest broadcast information such as network operational parameters, then each time the designated interval on protocol A expires, the access terminal may switch over to protocol B, scan protocol B to get the information desired, and then switch back to protocol A. Alternatively, if the access terminal needs to check for page messages or the like at a defined slot cycle on protocol B, then each time the designated interval expires on protocol A, the access terminal may wait until a next upcoming slot of the slot cycle and switch over to scan for a page message or the like at that slot on protocol B, and then switch back to protocol A. In either case, the time interval would define a minimum amount of time that the access terminal would stay on protocol A before switching to protocol B to scan for broadcast information.

Although this process of temporarily switching from one air interface protocol to another serves a useful purpose, it also creates a problem: if the access terminal is engaged in communication on the first air interface protocol, the process of temporarily switching to the other air interface protocol can disrupt that communication. For instance, if an access terminal is engaged in an active data communication session on IS-856, each instance of the access terminal tuning away to scan for information on IS-2000 may disrupt the access terminal's data communication on IS-856. The result of such disruption would then likely be a decrease in the overall data transmission rate that the access terminal (and thus a user of the access terminal) would experience on IS-856, since it will take longer to communicate a given amount of data due to the pauses in that communication.

Given the importance of switching over from protocol A to protocol B to scan for broadcast information on protocol B, but given that such a switch can disrupt ongoing communications on protocol A, it would be beneficial to provide a mechanism for dynamically setting a minimum time interval for the access terminal to operate on protocol A between instances of temporarily switching over to protocol B to scan for broadcast information.

Disclosed herein is such a method.

The method is carried out by a hybrid access terminal (i.e., a multi-mode access terminal) that has a first mode in which the access terminal engages in wireless communication according to a first air interface protocol and a second mode in which the access terminal engages in wireless communication according to a second air interface protocol. In practice such an access terminal will repeatedly (i) operate in the first mode for an interval of time and (ii) upon expiration of the interval, temporarily switch from the first mode to the second mode to obtain information broadcast on the second air interface protocol and then switch back to the first mode. Alternatively, the access terminal may repeatedly (i) operate in the first mode for the interval of time and (ii) upon expiration of the interval, wait for a next time slot of a slot cycle under the second air interface protocol and at that time slot switch from the first mode to the second mode to scan for information broadcast on the second air interface protocol and then switch back to the first mode.

According to the method, the access terminal will dynamically set the interval of time (for use in the process steps just described) based on a measure of how long the access terminal has tended to be switched away from the first mode to operate in the second mode, such as how long the access terminal has tended to be switched away to scan for information broadcast on the second air interface protocol. The theory of this process is that, for one reason or another, the access terminal may take a longer time or shorter time to successfully lock onto the channel(s) that it needs to scan on the second air interface protocol. For instance, if air interface conditions on the second protocol are poor, it may take longer for the access terminal to lock onto an overhead channel on protocol B to get network operational parameters and/or to determine whether there is a page message for the access terminal. On the other hand, if air interface conditions on the second protocol are good, the access terminal may be able to quickly scan for the information it needs on protocol B.

In scenarios where it is tending to take the access terminal more time to accomplish its task on the second air interface protocol, there may be more disruption of any communication underway on the first air interface protocol. Consequently, in those scenarios, it may be preferably for the access terminal to not switch over to the second air interface protocol as often as it would otherwise; thus, it would be beneficial for the access terminal to stay on the first air interface protocol for a longer interval between instances of temporarily switching over to the second air interface protocol. On the other hand, in scenarios where it is taking the access terminal less time to accomplish its task on the second air interface protocol, there should be less disruption of any communication underway on the first air interface protocol. Consequently, in those scenarios, it would be acceptable for the access terminal to switch over to the second air interface protocol more often; thus, it would be acceptable for the access terminal to stay on the first air interface protocol for a shorter interval between instances of temporarily switching over to the second air interface protocol.

In practice, the access terminal may thus monitor how long the access terminal has tended to be switched away from the first air interface protocol to operate on the second air interface protocol, particularly where the switch-away is at least or entirely for purposes of scanning for information broadcast on the second air interface protocol. This monitoring can be a very simple task carried out programmatically by the access terminal, such as by keeping track of each time period from when the access terminal switches away from the first air interface protocol to scan the second air interface protocol to when the access terminal switches back to the first air interface protocol. The access terminal may maintain a rolling average of this switch-away or "tune-away" period, preferably giving more weight to the most recent instances of being switched away, since the most recent instances are the most relevant. Or the access terminal may simply use the duration of just its most recent switch-away period as the measure of how long the access terminal has most recently tended to be switched away from the first air interface protocol to operate on the second air interface protocol.

The access terminal may apply any a variety of mapping data and logic to correlate the determined measure of switch-away time to a minimum time interval that the access terminal should stay on the first air interface protocol between instances of temporarily switching over to the second air interface protocol. For instance, the access terminal may begin with a baseline time interval, and the access terminal may programmatically increase or decrease the time interval as the measured switch-away period passes certain high or low thresholds. Optionally, the access terminal could further be programmed to treat the baseline time interval as a low-end cap, such that the access terminal could increase the interval to longer than the baseline but could not decrease the interval to below the baseline. As another example, rather or in addition to correlating particular switch-away periods to particular adjustments of the time interval, the access terminal may maintain a table that specifies particular time intervals to use based on particular measures of switch-away time and may thus programmatically apply the time interval specified to correlate with the latest measure of switch-away time.

These as well as other aspects and advantages will become apparent to those of ordinary skill in the art by reading the following detailed description, with reference where appropriate to the accompanying drawings. Further, it should be understood that the description provided in this overview and elsewhere in this document is intended to characterize the present method and apparatus by way of example only.

BRIEF DESCRIPTION OF THE DRAWINGS

FIG. 4 is a timing diagram illustrating variation of time interval between temporary switch-away periods in accordance with the method.

FIG. 5 is another timing diagram illustrating variation of time interval between temporary switch-away periods in accordance with the method.

DETAILED DESCRIPTION

Figure 1:
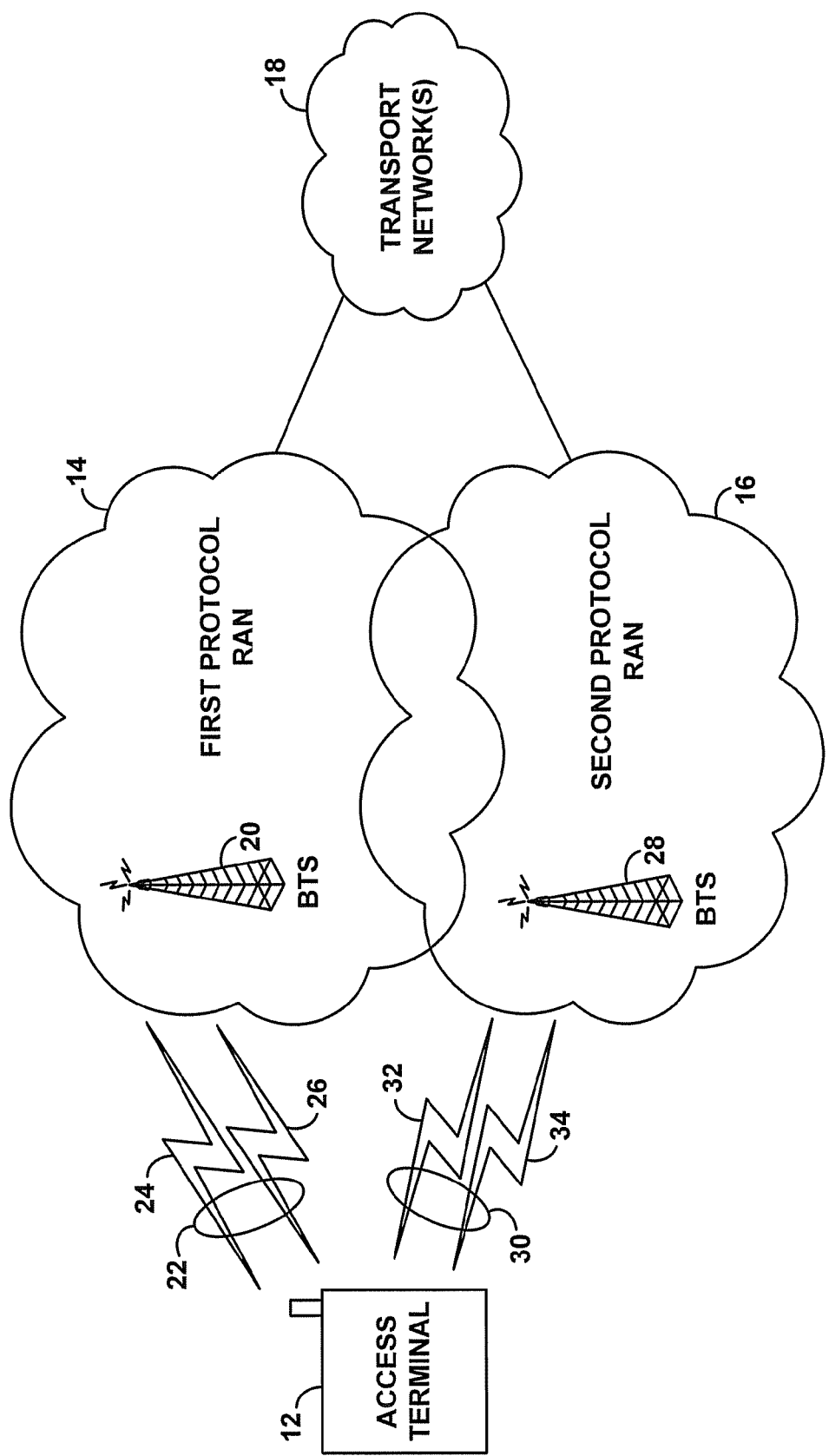
FIG. 1 is a simplified block diagram of a system in which the present method can be implemented.

Referring to the drawings, as noted above, FIG. 1 is a generalized block diagram depicting a system in which an exemplary embodiment of the present method can be implemented. As shown, the system includes a hybrid access terminal 12 and multiple radio access networks (RANs) 14, 16 each operable to the serve the access terminal, such as to provide the access terminal with connectivity to one or more transport networks 18 (e.g., the PSTN and/or the Internet). Of the two representative RANs shown, RAN 14 operates according to a first air interface protocol, and RAN 16 operates according to a second air interface protocol. By way of example, and without limitation, the first air interface protocol may be an IS-856 protocol such as 1xEV-DO and the second air interface protocol may be an IS-2000 protocol such as 1xRTT.

Each RAN is shown including at least one base station (or access point), which has an antenna structure and associated hardware or logic for radiating to define a radio frequency (RF) air interface through which the access terminal 12 can communicate with the RAN, and each air interface may define one or more respective traffic channels and control channels.

For instance, RAN 14 is shown including a base station 20 that radiates to define an air interface 22 compliant with a first air interface protocol (first protocol), including by way of example a first protocol traffic channel 24 and a first protocol control channel 26. RAN 16 is then shown including a base station 28 that radiates to define an air interface 30 compliant with a second air interface protocol (second protocol), including by way of example a second protocol traffic channel 32 and a second protocol control channel 34. The numbers of channels shown is merely an example and is not intended to be limiting.

Each of these air interface channels may be defined through any mechanism now known or later developed, examples of which include, without limitation, code division multiplexing, time division multiplexing, and frequency division multiplexing. Further, the control channels may serve various functions. For example, the control channels may include pilot channels, paging channels, and sync channels, and may function to broadcast information such as page messages directed to particular access terminals and/or general overhead messages such as channel list messages (denoting available frequencies), access parameters messages (denoting parameters usable by an access terminal to gain access to the RAN), and system parameters messages (denoting parameters such as the number of paging channels in use by the RAN) for instance.

RANs 14, 16 are shown as physically separate arrangements to emphasize that they employ disparate air interface protocols. In practice, however, the RANs may be physically co-located in an overlay arrangement for instance, sharing a common base station tower/antennas and other equipment, with shared or separate channel cards/units and associated logic for each air interface protocol. Alternatively, the RANs may be separate to some extent, with respective base stations for instance. The specific details of the RAN arrangements and their physical relationship with each other are not critical.

Access terminal 12 can take various forms, provided that the access terminal is equipped to engage in wireless communication according to at least the first air interface protocol and the second air interface protocol. By way of example, access terminal 12 may be a multi-mode wireless data communication module arranged for connection with a personal computer (or the like), by a PCMCIA, USB, or BLUETOOTH interface for instance, to provide the computer with cellular wireless communication functionality. Such an access terminal may be capable of engaging in wireless packet-data communication on the first air interface protocol and wireless packet-data communication on the second air interface protocol. As another example, the access terminal may be a multi-mode data-capable cell phone, capable of engaging in wireless packet-data communication on the first air interface protocol and legacy voice call communication and/or wireless-packet data communication on the second air interface protocol. Numerous other examples are possible as well.

Figure 2:
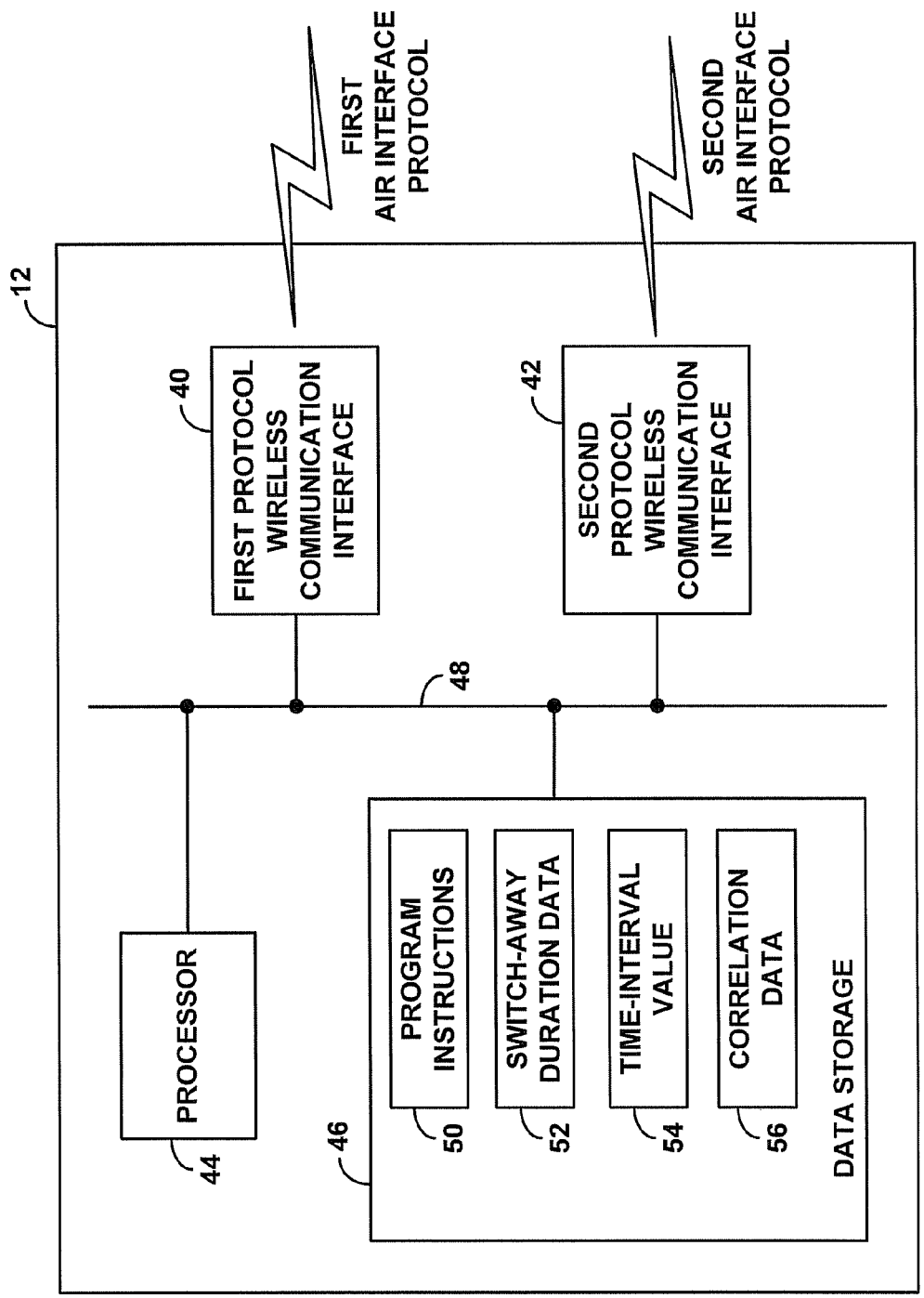
FIG. 2 is a simplified block diagram of functional components that can be included in an exemplary access terminal arranged to implement the method.

FIG. 2 is a simplified block diagram of functional components that can be included in an exemplary version of the access terminal 12. As shown, the exemplary access terminal includes at least a first wireless communication interface 40, a second wireless communication interface 42, a processor 44, and data storage 46, all of which may be communicatively linked together by a system bus or other mechanism 48. In practice, the access terminal may also include other components, such as a user interface (e.g., if the access terminal is a cell phone) and local connection circuitry (e.g., if the access terminal is data card arranged for connection to a personal computer or the like), for instance, but those other components are not shown or described here. Further, it should be understood that the particular arrangement of the access terminal can vary greatly from that shown, possibly omitting, integrating, distributing, or substituting one or more components.

Wireless communication interfaces 40, 42 function to facilitate air interface communication with serving RANs according to the first and second air interface protocols. In particular, first wireless communication interface 40 may facilitate air interface communication with RAN 14 according to the first air interface protocol, and second wireless communication interface 42 may facilitate air interface communication with RAN 16 according to the second air interface protocol.

As such, each wireless communication interface may comprise a dedicated chipset, such as an MSM series chipset manufactured by Qualcomm Inc. for instance, designed to engage in air interface communication compliant with a respective air interface protocol, and each wireless communication interface may further include or be interconnected with one or more respective antennas to facilitate the air interface communication. Alternatively, the wireless communication interfaces 40, 42 may be integrated together, as a multi-mode chipset, such as a multi-mode MSM chipset from Qualcomm Inc. for instance, and may share one or more antennas. In practice, access terminal 12 may be set to communicate using just one of the wireless communication interfaces at a time and may therefore need to pause its operation on one air interface protocol when switching over to operate on the other air interface protocol. Alternatively, to any extent, the access terminal may be capable of communicating concurrently with both of its wireless communication interfaces; although the present method may not be as useful in that scenario, it could still be applied.

Processor 44 generally functions to control operation of the access terminal and particularly to carry out the functionality of the present method. As such, processor 44 may comprise one or more general purpose processors (such as INTEL processors or the like) and/or one or more special purpose processors (such as digital signal processors or application specific integrated circuits). If processor 44 includes more than one processor, the processors could work separately or in combination (e.g., in parallel). Further, the processor could be integrated with one or more of the wireless communication interfaces 40, 42. For instance, a single chipset or corresponding circuitry could be provided in the access terminal to function as part or all of the wireless communication interface of the terminal and to additional function control various operations of the access terminal including operation of the present method.

Data storage 46 comprises one or more volatile or non-volatile storage components, such as optical, magnetic, or organic storage, and may be integrated in whole or in part with processor 44.

Data storage 46 preferably holds program instructions 50 executable by processor 44 to carry out the various access terminal functions described herein. Alternatively, processor may carry out some or all of those functions through operation of hardware or firmware and/or through any combination of hardware, firmware, and/or software.

As shown, in an exemplary embodiment, data storage 46 may further hold switch-away duration data 52, time-interval value 54, and correlation data 56.

Switch-away duration data 52 may comprise one or more data values representative of how long the access terminal has tended to be switched away from the first air interface protocol to operate temporarily on the second air interface protocol. For instance, the switch-away duration data 52 may comprise a record of durations for each of the last N instances of the access terminal temporarily switching from the first air interface protocol to the second air interface protocol to scan for information broadcast on the second air interface protocol. Alternatively or additionally, the switch-away duration data 52 may comprise a rolled-up value such as a rolling average of such durations, preferably giving greater weight to more recent instances of being temporarily switched to the second air interface protocol.

Time-interval value 54 may specify the minimum interval of time that the access terminal is to stay on the first air interface protocol between instances of temporarily switching over to the second air interface protocol to scan for broadcast information. In practice, each time the access terminal returns to operate on the first air interface protocol, the access terminal may start a timer set to the interval value. Upon expiration of the timer, the access terminal may then temporarily switch from the first air interface protocol to the second air interface protocol to scan for broadcast information on the second air interface protocol, or the access terminal may then wait for the next slot of the access terminal's slot cycle and then temporarily switch from the first air interface protocol to the second air interface protocol to scan for broadcast information on the second air interface protocol. After finishing its scan for broadcast information on the second air interface protocol (e.g., after acquiring one or more desired network operational parameters and/or scanning a time slot for any page message relevant to the access terminal), the access terminal would then switch back from the second air interface protocol to the first air interface protocol and once more start the timer, repeating the process just described.

Correlation data 56 may comprise a table or other data structure that specifies correlations between particular measures (e.g., ranges) of switch-away duration and particular adjustments to make to the time-interval value 54. As such, correlation data 56 may be set forth as program logic executable by processor 44 (e.g., as if . . . then constructs) or may be set forth as reference data to which processor 44 can refer. In a simple implementation, the correlation data 56 may simply define high and low trigger thresholds for making adjustments to the time-interval value. Further, as noted above, the correlation data 56 may define a low-end cap (possibly a starting value) below which the processor 44 would not decrease the time-interval value. Because the particular correlations are a matter of design choice, examples are not provide here.

In practice, the present method involves carrying out two functions: (a) operating on the first air interface protocol for the currently designated time-interval and, upon expiration of the time-interval, switching to the second air interface protocol to scan for broadcast information or waiting for a next slot of a slot cycle and switching over to the second air interface protocol to scan for broadcast information, and then switching back from the second air interface protocol, and (b) dynamically setting the time-interval based on a measure of how long the access terminal has tended to be switched away from the first air interface protocol to operate on the second air interface protocol.

These functions may occur in parallel or in series. For example, the access terminal may operate a background process to regularly monitor how long the access terminal has tended to be switched away from the first air interface protocol to operate on the second air interface protocol. The access terminal may evaluate that measurement periodically or in response to one or more triggering events, and the access terminal may use the correlation data 56 to accordingly adjust or set the time-interval value 54. Thus, at any given instant of time, the access terminal may have a currently set time-interval value based on that analysis. Separately from that background process, the access terminal may carry out the function of operating on the first air interface protocol for the currently designated time-interval and so forth as discussed above, using the currently set time-interval value in the process.

Alternatively or additionally, the access terminal may dynamically adjust or set the time-interval value each time the access terminal switches back from the second air interface protocol. In particular, given the duration of the switch-away period for the just completed instance of switching-away to the second air interface protocol to scan for broadcast information, the access terminal may update a rolling average of switch-away time or may simply consider the just passed switched-away period. Based on the rolling average or other such measure, the access terminal may then adjust or set the time-interval value and may set itself to use that time-interval value (or whatever remains of it, as some of it may be been used while the access terminal determined what time-interval value to use).

Figure 3:
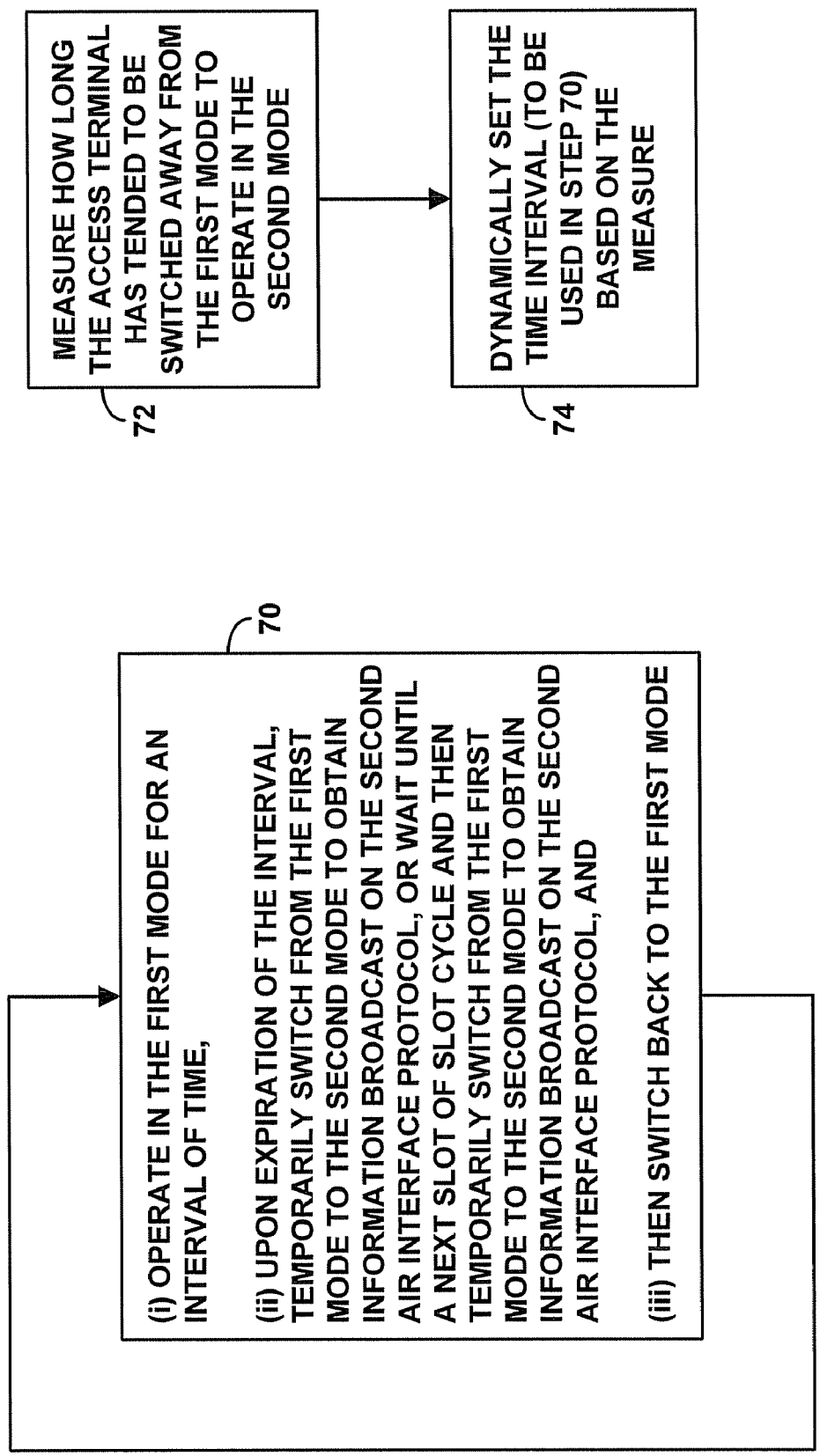
FIG. 3 is a set of flow diagrams depicting functions that can be carried out in accordance with the method.

FIG. 3 is a set of process flow diagrams depicting functions that can be implemented by access terminal 12 according to the present method. As discussed above, the method assumes that the access terminal has at least two modes of operation. In a first mode, the access terminal engages in wireless communication according to a first air interface protocol (e.g., with RAN 14), and in a second mode, the access terminal engages in wireless communication according to a second air interface protocol (e.g., with RAN 16).

As shown in the process flow diagram on the left side of FIG. 3, at step 70, the access terminal (i) operates in the first mode for an interval of time, (ii) upon expiration of the interval, temporarily switches from the first mode to the second mode to obtain information broadcast on the second air interface protocol, or waits until a next slot of the access terminal's slot cycle and then temporarily switches from the first mode to the second mode to obtain information broadcast on the second air interface protocol, and (iii) then switches back to the first mode. Upon completion of step 70, as shown by the arrow, the access terminal then repeats step 70.

As shown in the process flow diagram on the right side of FIG. 3, at step 72, the access terminal measures how long the access terminal has tended to be switched away from the first mode to operate in the second mode, preferably temporarily to obtain information broadcast on the second air interface protocol, such as network operational parameters or a page message if any. At step 74, the access terminal then dynamically sets (e.g., adjusts) the time interval (to be used in step 70) based on the latest measure made in step 72.

FIGS. 4 and 5 are timelines illustrating the timing of access terminal operation on the first air interface protocol and the second air interface protocol in accordance with examples of the present method. In each figure, each instance of the access terminal temporarily operating on the second air interface protocol is shaded, whereas the time that the access terminal operates on the first air interface protocol (not being temporarily switched to the second air interface protocol) is shown clear, without shading.

FIG. 4 depicts timing in a scenario where the access terminal switches to the second air interface protocol upon expiration of the currently designated time-interval. As shown, the time interval between instances of switching to the second air interface protocol varies over time, as the access terminal dynamically sets the interval based on its latest measure of how long the access terminal has tended to be temporarily switched to the second air interface protocol to obtain broadcast information. In particular, as the switch-away period becomes larger, the interval of operation on the first air interface protocol may tend to become larger as shown.

FIG. 5 depicts timing in a scenario where the access terminal switches to the second air interface protocol to scan at a particular paging channel time slot according to the access terminal's slot cycle, and perhaps to scan for other broadcast information as well. In this figure, paging channel time slots are designated by reference letter P under the timeline. As shown in this figure, by way of example, each time the current time-interval expires, the access terminal then waits until a next time slot on the slot cycle. The wait until the next time slot on the slot cycle will vary depending on when the time-interval expired in relation to when a last time slot on the slot cycle occurred. Thus, in this example, multiple factors affect how long the access terminal remains on the first air interface protocol between instance of temporarily switching to the second air interface protocol to scan for broadcast information.

An exemplary embodiment has been described above. Those skilled in the art will understand, however, that changes and modifications may be made to this embodiment without departing from the true scope and spirit of the claims, including their equivalents.

What is claimed is:

1. A hybrid access terminal having a first mode in which the hybrid access terminal engages in wireless communication according to a first air interface protocol and a second mode in which the hybrid access terminal engages in wireless communication according to a second air interface protocol, wherein the hybrid access terminal repeatedly (i) operates in the first mode for an interval of time and (ii) upon expiration of the interval, temporarily switches from the first mode to the second mode to obtain information broadcast on the second air interface protocol and then switches back to the first mode,
wherein the hybrid access terminal dynamically sets the interval based on a measure of how long the hybrid access terminal has tended to be switched away from the first mode to operate in the second mode.

2. The hybrid access terminal of claim 1, wherein the hybrid access terminal dynamically increases the interval when the measure indicates that the hybrid access terminal has tended to be switched away from the first mode for a threshold long time before switching back to the first mode.

3. The hybrid access terminal of claim 1, wherein the hybrid access terminal dynamically decreases the interval when the measure indicates that the hybrid access terminal has tended to be switched away from the first mode for a threshold short time before switching back to the first mode.

4. The hybrid access terminal of claim 1, wherein the hybrid access terminal maintains a rolling average of time that the hybrid access terminal has tended to be switched away from the first mode to operate in the second mode, and wherein the hybrid access terminal uses the rolling average as the measure.

5. The hybrid access terminal of claim 1, wherein the first air interface protocol is an IS-856 protocol, and the second protocol is an IS-2000 protocol.

6. The hybrid access terminal of claim 1, wherein the hybrid access terminal is a cellular wireless data communication module connectable to a personal computer to enable the personal computer to engage in cellular wireless communication.

7. The hybrid access terminal of claim 1, wherein the information comprises one or more network operational parameters for operating on the second air interface protocol.

8. The hybrid access terminal of claim 7, wherein the one or more network operational parameters comprise at least one of (i) data specifying one or more operating frequencies and (ii) data specifying a quantity of paging channels.

9. The hybrid access terminal of claim 7, wherein the one or more network operational parameters comprise at least one of (i) an access parameters message, and (ii) a system parameters message.

10. The hybrid access terminal of claim 1, wherein the information comprises a page message.

11. In a hybrid access terminal having a first mode in which the hybrid access terminal engages in wireless communication according to a first air interface protocol and a second mode in which the hybrid access terminal engages in wireless communication according to a second air interface protocol, a method comprising:
the hybrid access terminal repeatedly (i) operating in the first mode for an interval of time and (ii) upon expiration of the interval, temporarily switching from the first mode to the second mode to obtain information broadcast on the second air interface protocol and then switching back to the first mode; and
the hybrid access terminal automatically varying the interval based on a measure of how long the hybrid access terminal has tended to be switched away from the first mode to operate in the second mode, wherein the hybrid access terminal automatically increases the interval when the hybrid access terminal detects increased time switched away from the first mode, and the wherein the hybrid access terminal automatically decreases the interval when then hybrid access terminal detects decreased time switched away from the first mode.

12. The method of claim 11, further comprising:

the hybrid access terminal maintaining a rolling average of time that the hybrid access terminal has tended to be switched away from the first mode to operate in the second mode; and the hybrid access terminal using the rolling average as the measure.

13. The method of claim 11, wherein the first air interface protocol is an IS-856 protocol, and the second protocol is an IS-2000 protocol.

14. The method of claim 11, wherein the hybrid access terminal is a cellular wireless data communication module connectable to a personal computer to enable the personal computer to engage in cellular wireless communication.

15. The method of claim 11, wherein the information comprises one or more network operational parameters for operating on the second air interface protocol.

16. The method of claim 15, wherein the one or more network operational parameters comprise at least one of (i) data specifying one or more operating frequencies and (ii) data specifying a quantity of paging channels.

17. The method of claim 15, wherein the one or more network operational parameters comprise at least one of (i) an access parameters message, and (ii) a system parameters message.

18. The method of claim 11, carried out while the hybrid access terminal is in an active data communication state on the first air interface protocol, wherein temporarily switching from the first mode to the second mode causes an interruption in data communication of data on the first air interface protocol.

19. A hybrid access terminal having a first mode in which the hybrid access terminal engages in wireless communication according to a first air interface protocol and a second mode in which the hybrid access terminal engages in wireless communication according to a second air interface protocol, wherein the hybrid access terminal repeatedly (i) operates in the first mode for an interval of time and (ii) upon expiration of the interval, waits for a next time slot of a slot cycle under the second air interface protocol and at that time slot switches from the first mode to the second mode to scan for information broadcast on the second air interface protocol and then switches back to the first mode, wherein the hybrid access terminal dynamically sets the interval based on a measure of how long the hybrid access terminal has tended to be switched away from the first mode to scan for information broadcast on the second air interface protocol.

20. The hybrid access terminal of claim 19, wherein the information comprises a page message.

\* \* \* \* \*